A. L. MORTON.
CONVEYING AND SPREADING APPARATUS.
APPLICATION FILED APR. 15, 1912.
1,064,364.
Patented June 10, 1913.
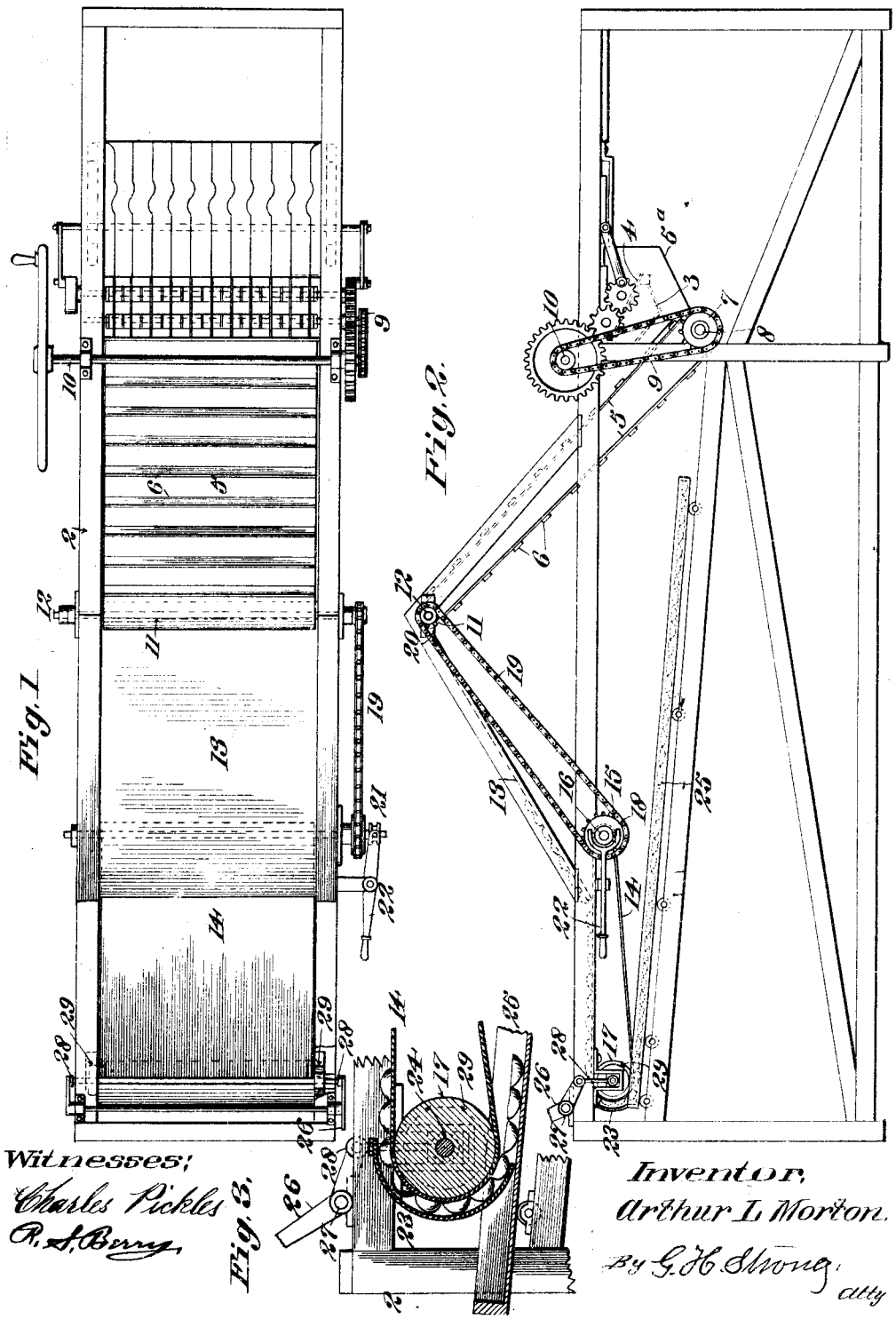

UNITED STATES PATENT OFFICE.

ARTHUR L. MORTON, OF MOUNTAIN VIEW, CALIFORNIA.

CONVEYING AND SPREADING APPARATUS.

1,064,364.  Specification of Letters Patent. Patented June 10, 1913.

Application filed April 15, 1912. Serial No. 690,954.

*To all whom it may concern:*

Be it known that I, ARTHUR L. MORTON, a citizen of the United States, residing at Mountain View, in the county of Santa Clara and State of California, have invented new and useful Improvements in Conveying and Spreading Apparatus, of which the following is a specification.

My invention relates to an apparatus for conveying and spreading fruit such as apricots, peaches and the like, and particularly in placing said fruit after it has been cut, with the cut faces upward upon trays where it will afterward be removed to the drying grounds.

The invention consists of the parts and the combination and construction of parts as hereinafter more fully described and claimed, having reference to the accompanying drawings, in which—

Figure 1 is a plan view of my apparatus. Fig. 2 is a side elevation. Fig. 3 is a partial view of the end of the turning and placing apparatus.

For the purpose of rapidly and properly drying such fruits, particularly as apricots and the like, it is desirable to first cut the fruit in halves, then to remove the pits therefrom, and lastly to position the halves with the cut side uppermost, in which position they are removed for drying purposes.

Various devices may be employed for cutting the fruit and removing the pits; such devices not forming a part of the present application.

The apparatus here shown for the carrying out of my invention consists of a main frame 2 upon which may be mounted a continuous apparatus for cutting and subsequent positioning of the fruit and placing it in the drying trays. After the fruit has been severed and the pits separated therefrom, the pits drop on to a discharge trough 3, and the severed sections of the fruit are received upon a platform composed of tongues or strips 4, from which they fall upon an inclined apron 5ª, down which they slide in whatever position they may fall. The accumulation on this platform will be received by an upwardly traveling belt conveyer 5, upon which are attached a number of spaced, transversely disposed ribs or slats 6. In actual practice these slats are quite thin, and I have found that ⅛″ in thickness is sufficient. As they pass beneath the accumulated fruit upon the apron 5ª they will be turned or rolled until eventually the flat surfaces of the sections are brought into contact with the flat surface of the upwardly traveling belt 5 and when the flat surfaces so rest upon the conveyer, the edge of each section of the fruit will be encountered by the thin slat 6. As fast as the fruit sections become arranged flat side down they will be carried upwardly resting in rows against the slats 6.

The lower end of the conveyer 5 passes around a suitable drum or cylinder 7 mounted upon a shaft 8 which is driven by a sprocket gear train 9. The driving member of this sprocket is secured upon the main drive shaft 10 of the apparatus. The conveyer belt 5 is shown as being arranged at an incline, and its upper end passes over a drum or cylinder 11 mounted upon the shaft 12. As the belt passes around the cylinder 11, the fruit sections are discharged upon an inclined platform or chute 13 which may be of sheet metal, and the upper end of this inclined surface is brought into close juxtaposition with the surface of the carrying belt 5. The sections of fruit discharged from this belt slide down the chute 13 and accumulate at its lower end in a compact continuously arranged mass, the lower sections of which are received by a conveyer belt 14 which runs beneath the lower end of the chute 13, and is supported upon a driving cylinder or drum 15 mounted upon a shaft 16, and at its opposite end is supported by a cylinder 17. The shaft 16 carries a sprocket wheel 18 over which the drive chain 19 travels, driven by a sprocket wheel 20 mounted upon one end of the shaft 12. The sprocket wheel 18 is loose on the shaft 16, and is provided with a clutch face adapted to be engaged by a shiftable clutch collar 21, which may be operated by a handle or lever 22.

An important feature of this invention is the means by which after the cut fruit has been conveyed from the chute and from the chute delivered upon the conveyer 14, the sections may be uniformly and positively delivered upon the tray or other device for drying purposes, with the flat or cut surfaces uppermost. As here shown, the carrying belt 14 travels around the cylinder 17, and around this cylinder is fitted a semicylindrical shell or hood 23, which is supported upon the shaft which carries the drum or cylinder 17. The surface of this hood 23 is preferably just sufficiently distant from and concentric with the cylinder 17 so as to positively retain the fruit sections with their faces against the surface of the belt or conveyer 14, while they are being carried around the cylinder 17; the hood thus prevents the slipping, dislodgment, or turning, of the fruit sections until they are eventually deposited upon a tray 25, by slipping off the lower transverse edge of the hood 23.

By the peculiar relationship of the chute 13 upon which the sections of fruit are discharged from the conveyer 5, and the position of the conveyer 14 upon which the successive transverse rows of fruit sections are received, it is insured that the tray 25 will be compactly filled with upturned sections of fruit symmetrically arranged in transverse rows, all the sections being placed faces up, that is, with the cut surfaces uppermost.

This apparatus is designed to fill trays 25, which are portable and capable of being transferred from one position to another, or to some subsequent apparatus for further treatment. The apparatus is therefore so constructed that the trays 25 may be inserted beneath the cylinder 17 and then when the clutch 21 is moved to engage the sprocket wheel 18, the conveyer 14 will be driven and the fruit collected from the chute 13. As the front end of the tray 25 is inserted beneath the cylinder 17, the latter is lifted so as to clear the end of the tray by depressing a lever 26, fulcrumed at 27, and connected by a link 28 to the cylinder shaft, thus lifting the cylinder 17 and the hood 23 sufficiently high to clear the end of the tray. After this has been done, the lever 26 is released to allow the lower edge of the guiding hood 23 to come down into position just above the front end of the bottom of the tray 25, then as the fruit is fed by the conveyer 14 through the hood 23, it is discharged in successive rows upon the tray 25. The tray is automatically advanced during the filling by means of rollers 29 secured upon the drum shaft 24 and which rollers rest upon the vertical sides of the tray 25. Thus it will be seen that as long as the conveyer belt 14 is operative to carry the fruit sections through the reversing hood 23, the friction wheels or rollers 29 resting upon the edges of the tray will cause this to gradually advance to provide room for the succeeding rows of fruit. An accumulation of the sections of fruit is insured at the lower end of the chute 13 by speeding up the conveyer, so that it will always carry a sufficient number of sections to cause them to collect at the lower end of the chute 13, with a little greater rapidity than they can be carried away by the reversing conveyer 14. After a tray has been entirely filled with the fruit sections, the operator simply depresses the lever 26 to lift the reversing hood 23 sufficiently to clear the side walls of the tray 25, and the latter can then be removed without interference from the apparatus, and conveyed to some other point. The operator unclutches the shaft 16 to stop the belt 14 when the tray is to be removed.

Having thus described my invention what I claim and desire to secure by Letters Patent is—

1. In a fruit conveying and spreading apparatus, the combination with feeding mechanism and a conveyer upon which the material is delivered, of a removable tray positioned below and proximate the delivery end of the conveyer, a hood forming a guide through which the fruit is transferred from the conveyer, and placed upon the tray in a reversed position, said hood entering the tray between the sides thereof and delivering the pieces of fruit directly upon the body in successive order, and means for elevating the outer end of the conveyer and the hood out of the tray to permit the conveyer and hood to clear the side walls of the tray.

2. In a fruit conveying and spreading apparatus, the combination with feeding mechanism and a conveyer upon which the material is delivered, of a removable tray positioned below and proximate the delivery end of the conveyer, and a hood forming a guide through which the fruit is transferred from the conveyer, and placed upon the tray in a reversed position, said hood entering in the tray between the sides thereof and delivering the pieces of fruit directly upon the body in successive order, and means for elevating the conveyer and hood to permit of the removal of the tray with its assembled fruit sections.

3. In a fruit conveying and spreading apparatus, the combination with feeding mechanism and a conveyer upon which the material is delivered, of a removable tray positioned below and proximate the delivery end of the conveyer, and a hood forming a guide through which the fruit is transferred from the conveyer, and placed upon the tray in a reversed position, said hood entering the tray between the sides thereof and delivering pieces of fruit directly upon the body in successive order, and means connecting with the conveyer for elevating the discharge end of the same and the hood to permit of the removal of the tray and its assembled fruit sections.

In testimony whereof I have hereunto set my hand in the presence of two subscribing witnesses.

ARTHUR L. MORTON.

Witnesses:
A. S. MOORE,
J. W. LOVEJOY.